DATA TRANSFER AND CONVERSION CIRCUIT

Filed Dec. 28, 1961 6 Sheets-Sheet 1

INVENTORS
JOHN K. CRAWFORD
CHESTER M. PIETRAS
BY D. Kendall Cooper
ATTORNEY

Sept. 20, 1966 J. K. CRAWFORD ET AL 3,274,378

DATA TRANSFER AND CONVERSION CIRCUIT

Filed Dec. 28, 1961 6 Sheets-Sheet 2

Sept. 20, 1966 J. K. CRAWFORD ETAL 3,274,378

DATA TRANSFER AND CONVERSION CIRCUIT

Filed Dec. 28, 1961 6 Sheets-Sheet 4

Sept. 20, 1966 J. K. CRAWFORD ETAL 3,274,378

DATA TRANSFER AND CONVERSION CIRCUIT

Filed Dec. 28, 1961 6 Sheets-Sheet 5

DATA TRANSFER AND CONVERSION CIRCUIT

Filed Dec. 28, 1961 6 Sheets-Sheet 6

United States Patent Office 3,274,378

Patented Sept. 20, 1966

3,274,378

DATA TRANSFER AND CONVERSION CIRCUIT

John K. Crawford and Chester M. Pietras, Poughkeepsie, N.Y., assignors to International Business Machines Corporation, New York, N.Y., a corporation of New York Filed Dec. 28, 1961, Ser. No. 162,788
9 Claims. (Cl. 235—154)

Figures 1, 2:
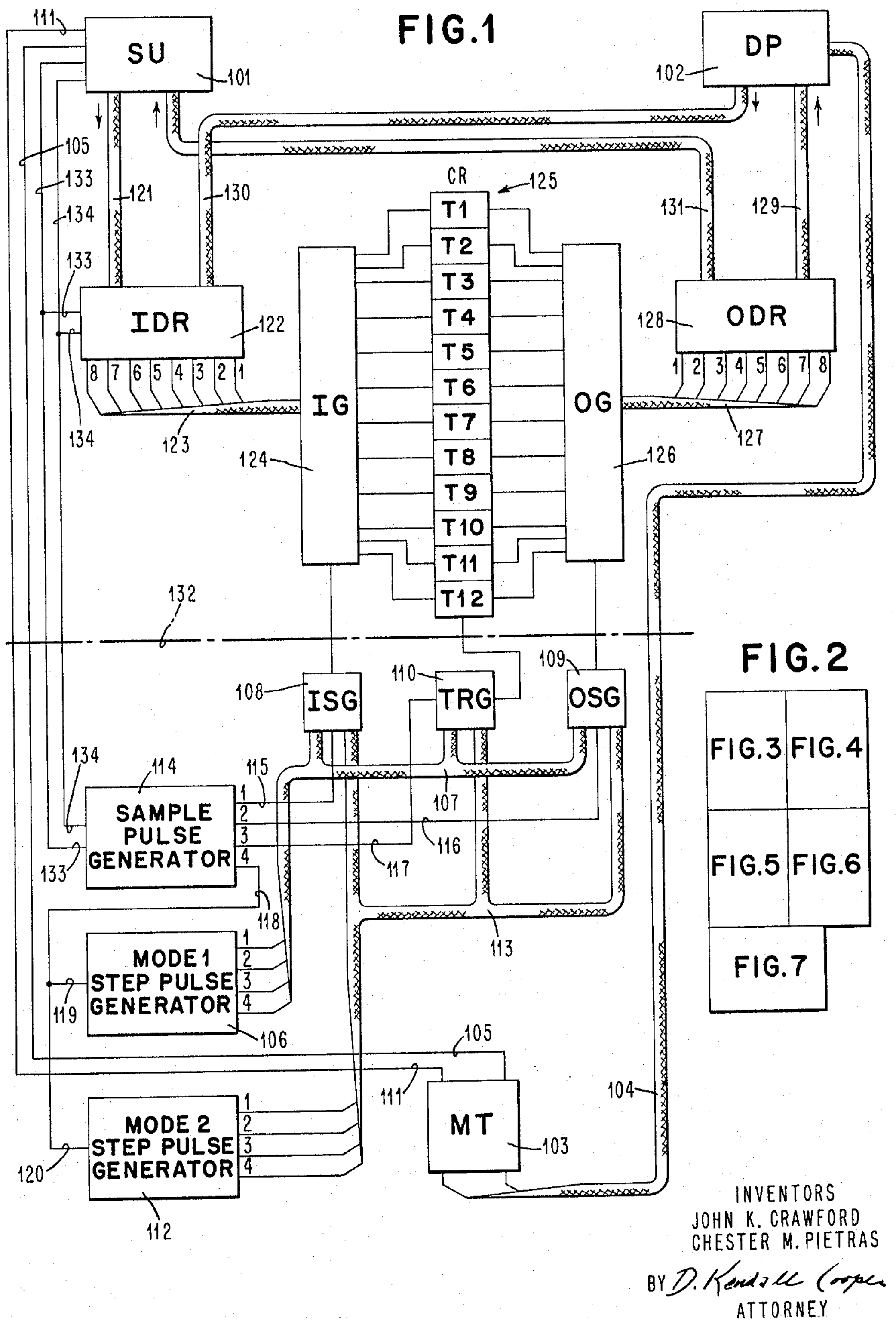

This invention relates to data transfer circuits, and more particularly, to circuits of this type which perform conversion of data from one format to another during transfer operations.

Data and control functions in electronic data processing systems have conventionally been performed with basic informational units of predetermined length that are designated "words" or "characters." Words and characters are usually made up of binary digits, termed "bits," that are arranged in groups with their significance being determined by their positional location within the group. Alphabetic and numeric characters are represented in this way by zero bits and one bits that are arranged in a predetermined way to form character groups.

In some cases, data bits are handled in groups that are less in number than a word, but greater in number than a character. These are termed "bytes." Each byte of information may have, but usually does not have informational significance when considered apart from other bytes of information. The use of bytes of information proves useful in some computer operations, such as those that merely involve the transfer of information from one storage media to another. Handling of data in bytes rather than shorter character lengths speeds up the transfer process. In addition, some comptuers are set up to handle bytes of variable length during arithmetic operations.

It becomes necessary at various times during transfer manipulations to convert characters to bytes and bytes to characters. In some cases, conversion from one byte length to another byte length may be required.

Heretofore, conversion circuits of this kind have required the provision of enough bit storage positions to accommodate the minimum number of input byte groups whose bit count total equals a whole number of output byte groups, and the same has applied to the output byte-input byte relationship. U.S. Patent No. 3,079,597 titled "Byte Converter" describes and claims a prior byte converter. For example, if 6-bit bytes are to be converted to 8-bit bytes, the lowest number of whole number input bytes whose bit count total would equal a whole number of output bytes is four. Four input bytes of 6 bits each, or 24 bits permits ready conversion to three output bytes of 8 bits each, or 24 bits. This has required, in the example noted, twenty-four positions of storage. Since byte conversion circuits are usually found in high volume production units of the input-output variety, such as magnetic tape control units, or the like, an inordinately large amount of hardware has been required for the byte conversion function.

Accordingly, an object of the invention is to provide a data transfer circuit which performs data conversion during transfer.

Another object of the invention is to provide a data transfer circuit which performs conversion from one data format to another.

A further object of the invention is the provision of a data transfer circuit for converting one data byte size to another data byte size.

Still another object of the invention is to provide a data transfer circuit that can operate in a plurality of data conversion modes.

An additional object of the invention is to provide a data conversion circuit which functions with a minimum amount of hardware, and that is based on optimized circuit arrangements and formulated principles.

In order to accomplish these and other objects of the invention, a data transfer circuit has been provided which selectively operates in either of two conversion modes and which transfers groups of data with conversion from one format to another, or conversely, depending on the mode selected, and wherein conversion is based on a time-sharing of conversion storage facilities.

The foregoing and other objects, features and advantages of the invention will be apparent from the following more particular description of the preferred embodiment of the invention as illustrated in the accompanying drawings.

In the drawings:

FIGURE 1 represents a block diagram of the preferred embodiment of the invention.

FIGURE 2 indicates the arrangement of FIGURES 3–7.

FIGURES 3–7 represent the circuit of FIGURE 1 in greater detail.

*General description*

The circuit of FIGURE 1 includes a Storage Unit (SU) 101, such as a magnetic tape unit, and a Data Processor (DP) Unit 102. The circuit operates in either of two data transfer and conversion modes depending on the state of a Mode Trigger (MT) 103. The state of the Mode Trigger 103, in turn, is established by control pulses on Bus 104 from the Data Processor 102.

An output from the Mode Trigger 103 on line 105 gates output pulses 1–4 from a Mode 1 Step Pulse Generator 106 through Bus 107 to condition Input Sample Gates (ISG) 108, Output Sample Gates (OSG) 109, and Trigger Reset Gates (TRG) 110 for Mode 1 operation. A comparable output from Mode Trigger 103 on line 111, when in its other state, gates output pulses 1–4 from a Mode 2 Step Pulse Generator 112 through Bus 113 to condition Gates 108, 109, and 110 for Mode 2 operation. The Mode Trigger 103 outputs on lines 105 and 111 are also directed to the Storage Unit 101 for control purposes and to establish a proper operation of Unit 101 for the mode selected.

Each step pulse 1–4 from either Generator 106 or Generator 112 represents a cycle of operation of the circuit of FIGURE 1. A complete operation in either Mode 1 or Mode 2 encompasses four cycles.

A Sample Pulse Generator 114 supplies output pulses 1–4 on lines 115–118. One set of pulses 1–4 from Sample Generator 114 occurs during each cycle of operation in either mode. Sample pulses 1–3 on lines 115–117 actuate Gates 108, 109 and 110 that are selectively conditioned by Generator 106 during Mode 1 and Generator 112 during Mode 2. Sample pulse 4 during the latter part of each cycle on line 118 effects stepping of each Generator 106 and 112 on lines 119 and 120, respectively.

If a cycle of operations comprises 360°, a typical sequence of sample pulses 1–4 could be arranged to occur as indicated below:

| | |
|---|---|
| Sample 1—10°–30° | Sample 3—180°–210° |
| Sample 2—100°–120° | Sample 4—280°–300° |

The pulse timings are selected arbitrarily for illustrative purposes only, and other timings could be selected, if desired.

During a Mode 1 operation, data is transferred from Storage Unit 101 on Bus 121 to an Input Data Register (IDR) 122; and from there over a Bus 123 through Input Gates (IG) 124 to a Conversion Register (CR) 125 which, in the exemplary embodiment, comprises twelve bistable trigger storage positions T1–T12. From the Conversion Register 125, the data is gated through Output Gates (OG) 126, by Bus 127 to an Output Data Register (ODR) 128, and from there to the Data Processor 102 by Bus 129. The Mode 1 operation may also be referred to as a "Read" operation, to indicate that information is being read from the Storage Unit 101.

During a Mode 2 operation, data is transferred from the Data Processor 102 by Bus 130 to the Input Data Regitser 122, from there through the Conversion Register 125, the Output Data Register 128 and Bus 131 to the Storage Unit 101. The Mode 2 operation may be referred to as a "Write" operation to indicate that information is being written into Storage Unit 101.

In a Mode 1 operation, Storage Unit 101 supplies a pulse on lines 133 each time a data byte or character is transferred on Bus 121 from Unit 101 to the Input Data Register 122. In a Mode 2 operation, Storage Unit 101 supplies a similar pulse on line 134 to initiate each cycle, and to gate a data byte from Data Processor 102 on Bus 130 into the Input Data Register 122, when appropriate.

Each of the twelve storage positions T1–T12 of Conversion Register 125 may be considered to be available (inactive) when no data bit is stored therein; or unavailable (active) when it has a data bit stored therein, either a binary one or a binary zero.

Data bits are transferred or read in from Input Data Register 122 through Input Gates 124 to available positions of the Conversion Register 125 that are selectively loaded in sets large enough to handle each input byte under control of pulses from the Input Sample Gates 108. Data bits are transfrered or read out of previously loaded positions of the Conversion Register 125 through the Output Gates 126 to the Output Data Register 128 under control of pulses from the Output Sample Gates 109. Any of the positions T1–T12 of the Conversion Register 125 are reset after read out under control of pulses from the Trigger Reset Gates (TRG) 110. The outputs from Gates 108, 109 and 110 are variable, and depend on the mode selected.

In order to illustrate the operation of the circuit of FIGURE 1 and its detailed counterpart of FIGURES 3–7, it will be assumed that the Storage Unit 101 handles data bytes that are six bits in length which, in this case, represent individual characters of information. The individual bit position of each byte transferred to or from Unit 101 can be designated as follows:

| | |
|---|---|
| Bit Position | 1—2—3—4—5—6 |
| Designation | B—A—8—4—2—1 |

It will further be assumed that the Data Processor Unit 102 handles data bytes that are eight bits in length. An eight-bit byte from Unit 102 has no particular significance when considered apart from other eight-bit bytes. In some cases, a Unit 102 byte may contain a complete six-bit character plus a two-bit portion of another six-bit character, while in other cases it may contain meaningless portions of two separate characters.

In order to transfer information from Unit 101 to Unit 102, it is necessary that the circuit of FIGURE 1 perform a six-bit byte to eight-bit byte (6 x 8) conversion. This type of conversion is performed during a Mode 1 operation. Conversely, in order to transfer information from Unit 102 to Unit 101, it is necessary that the circuit of FIGURE 1 perform an eight-bit byte to six-bit byte (8 x 6) conversion. This type of conversion is performed during a Mode 2 operation. The Input Data Register 122 and the Output Data Register 128 each have eight storage positions, numbered 1–8, so that each can accommodate the maximum byte length of eight bits, as required according to the mode selected.

In accordance with an important principle of the invention, both types of conversion are performed by using an absolute minimum of storage positions in the conversion circuit. The positions that are provided are used in a more efficient manner, since the respective positions are active more than once during a conversion operation.

The minimization of storage positions for any conversion operation can be accomplished by using the following formula:

$$X = A + B - LCF$$

In this formula, $X$=Minimum number of storage positions required
$A$=Size (bit length) of input byte
$B$=Size (bit length) of output byte
$LCF$=Least common factor of A and B In the assumed example, where conversion of 6 x 8 and 8 x 6 is required, the storage positions required are determined in the manner indicated below:

Mode 1:
Size of input byte=6
Size of output byte=8
$LCF=2$ therefore $$X = A + B - LCF$$
$$X = 6 + 8 - 2$$
$$X = 12$$

It will be recalled that the circuit of FIGURE 1 has twelve (12) positions of conversion storage, triggers T1–T12, which is the number of positions needed, as indicated by the formula.

The number of storage positions required for a Mode 2 operation happens to be identical in this case, although it is apparent that if byte sizes other than 6 and 8 were to be selected for a Mode 2 operation, an appropriate number of trigger positions and gating could be provided to accommodate them.

The formula just discussed is further based on the assumptions that the largest byte is less than two small bytes, and that the time required for transferring a small byte is less than the interval between large bytes.

*Mode 1 transfer and conversion*

A detailed Mode 1 (6 x 8) transfer and conversion operation will be considered first by reference to the circuits of FIGURES 3–7 which should be arranged as shown in FIGURE 2. Thereafter, a Mode 2 (8 x 6) transfer and conversion operation will be discussed.

The circuits of FIGURES 3–7 together form a more detailed version of the circuit of FIGURE 1. The arrangement of logic and circuit elements is generally like that of FIGURE 1, with the exception that Storage Unit 101 and Data Processor 102 are not shown.

Those elements in FIGURES 3–7 which are identical with like elements in FIGURE 1 are given like reference numerals. Where an element has not been referred to in FIGURE 1, it is referred to in a manner to indicate in which figure it may be found. Line 301, for example, is in FIGURE 3.

Figure 7:
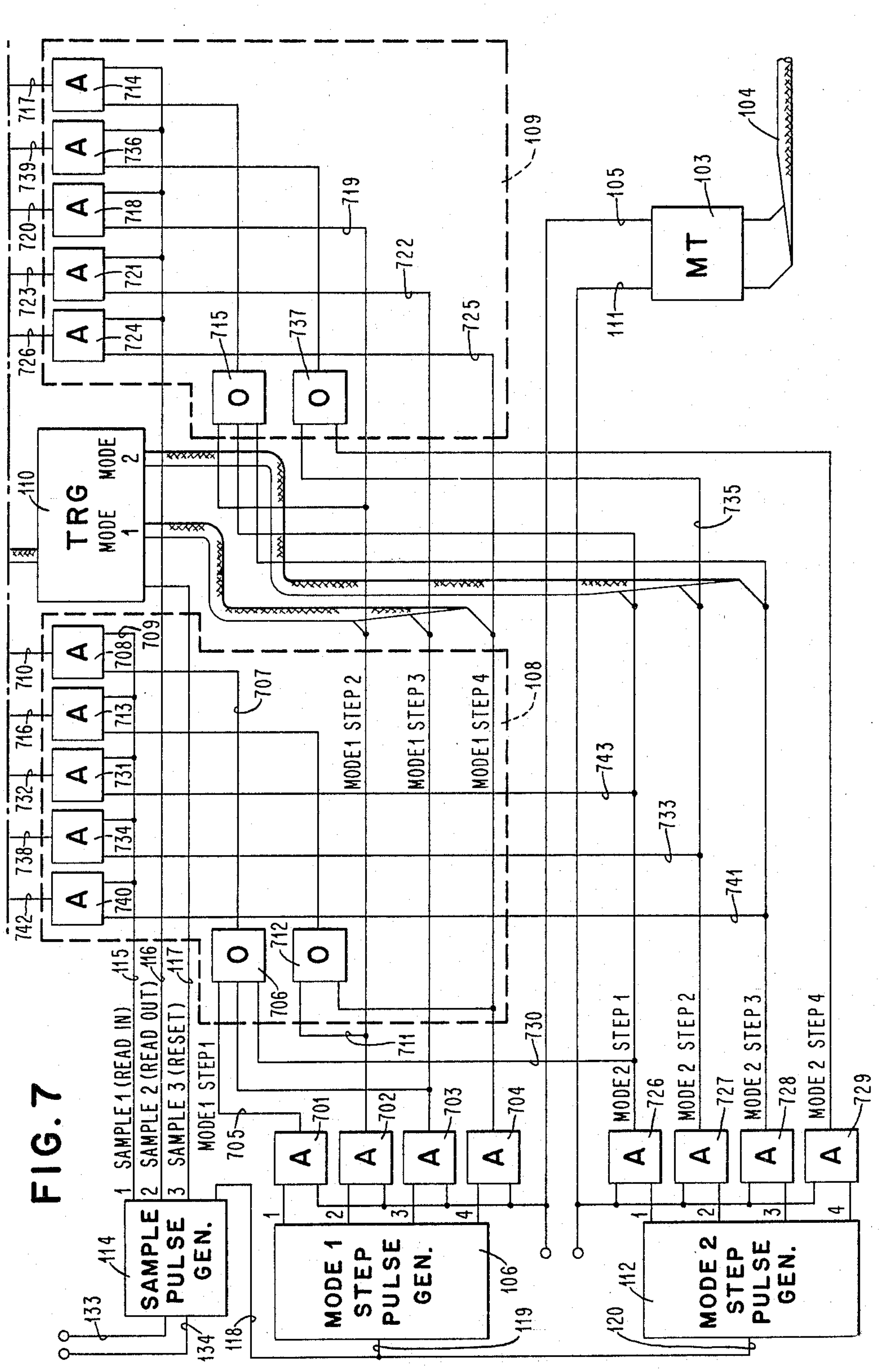

Gating lines that extend across several figures are referenced by a numeral that indicates the figure on which they originate. For example, gating line 710 in FIGURE 7 is so designated in FIGURES 3 and 5.

Figure 3:
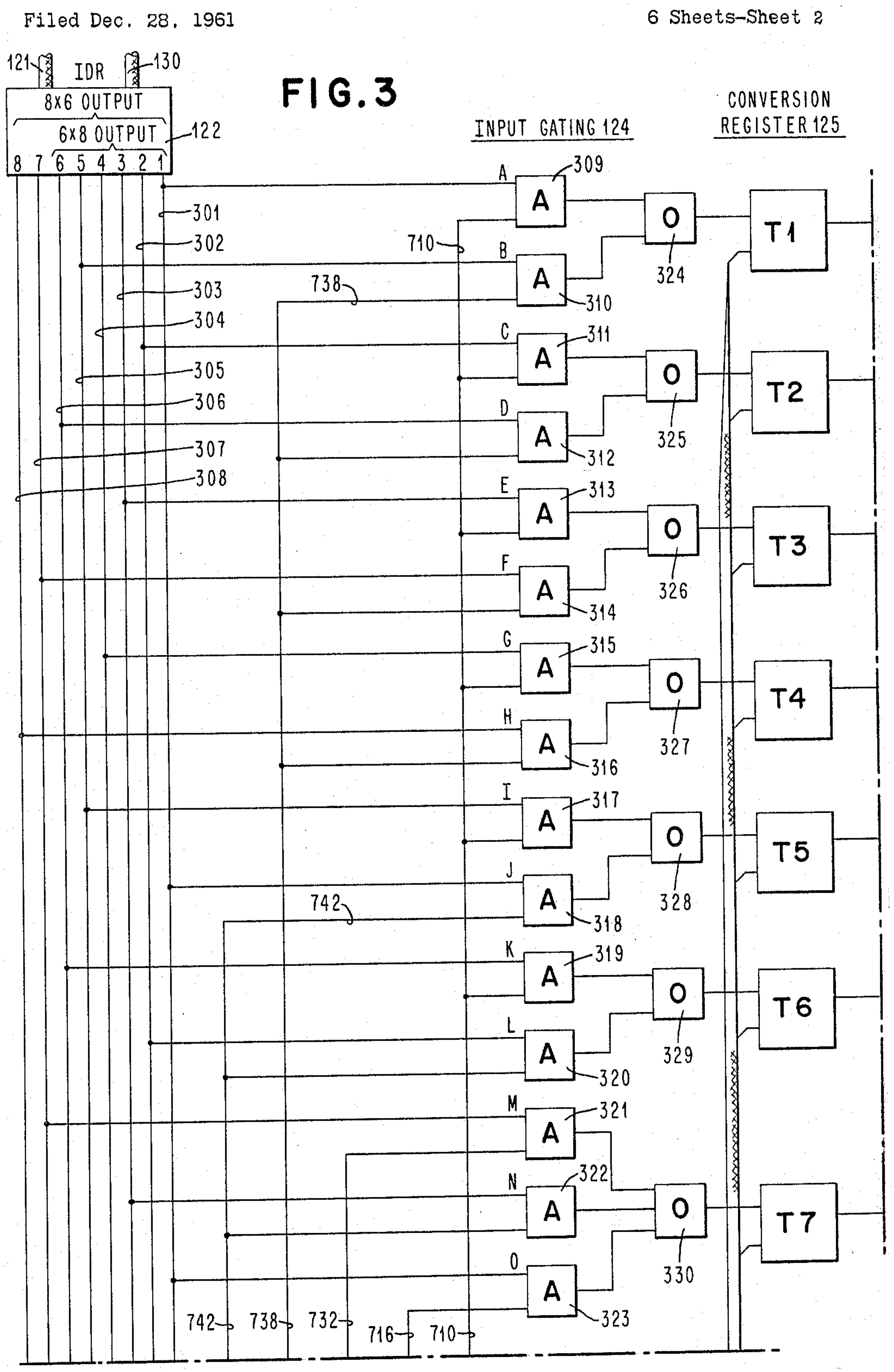
Figure 4:
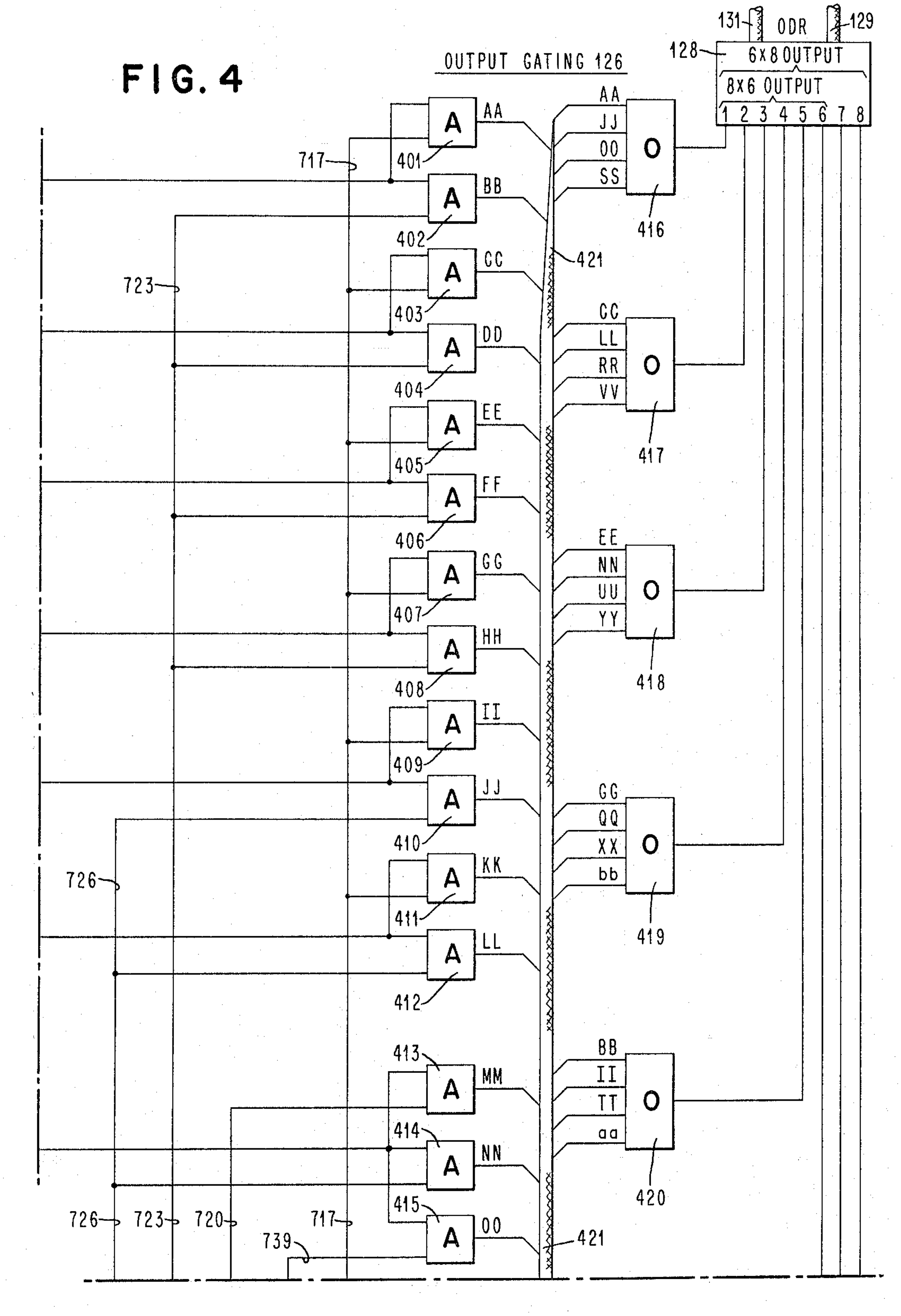

The Input Data Register 122 is shown in FIGURE 3. The Input Gating 124 is shown partly in FIGURE 3 and partly in FIGURE 5. Storage positions T1–T7 of the Conversion Register 125 are in FIGURE 3, while storage positions T8–T12 are in FIGURE 5. The Output Gating 126 is shown partly in FIGURE 4 and partly in FIGURE 6. The Output Data Register 128 is in FIGURE 4.

Those elements in FIGURE 1 that are generally located below the reference line 132 will be found in FIGURE 7.

It is assumed that, prior to commencement of operations, all registers are in a reset or cleared condition. The Generators 106, 112 and 114 are in a rest condition, so that no pulses are available from Generator 114, but the Step Output lines 1 of Mode 1 Generator 106 and Mode 2 Generator 112 are both up.

The Data processor indicates that a Mode 1 (6 x 8) or Read operation is required by a control signal on Bus 104 which sets Mode Trigger 103 to make line 105 active. As mentioned in connection with FIGURE 1, the same output is applied to Storage Unit 101 to initiate Read operations.

Active line 105, FIGURE 7, conditions one input each of AND gates 701–704. Since Output Step Line 1 of Mode 1 Generator 106 is also up, Gate 701 supplies an output on line 705 to OR block 706. An output from OR block 706 on line 707, in turn, conditions one input of AND gate 708.

The first 6 x 8 cycle is initiated when Storage Unit 101 indicates that the first byte of six bits is available in the Input Data Register 122 by pulsing line 133, FIGURE 7. Each six-bit byte is assumed to be gated into the Input Data Register (IDR) 122 in the positions indicated below:

| | |
|---|---|
| IDR Position | 1—2—3—4—5—6—7—8 |
| Byte Position | B—A—8—4—2—1—0—0 |

Figure 5:
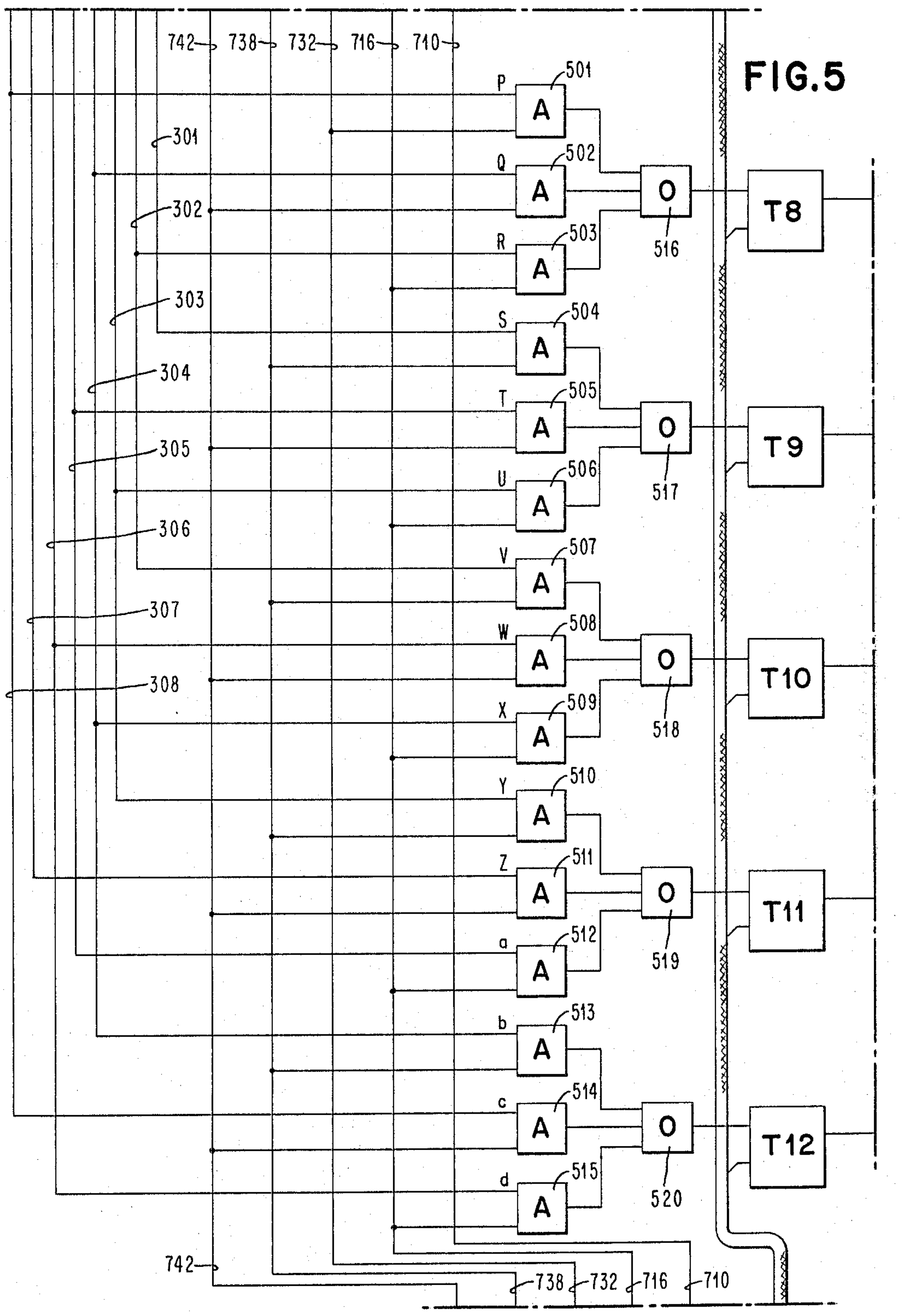
Figure 6:
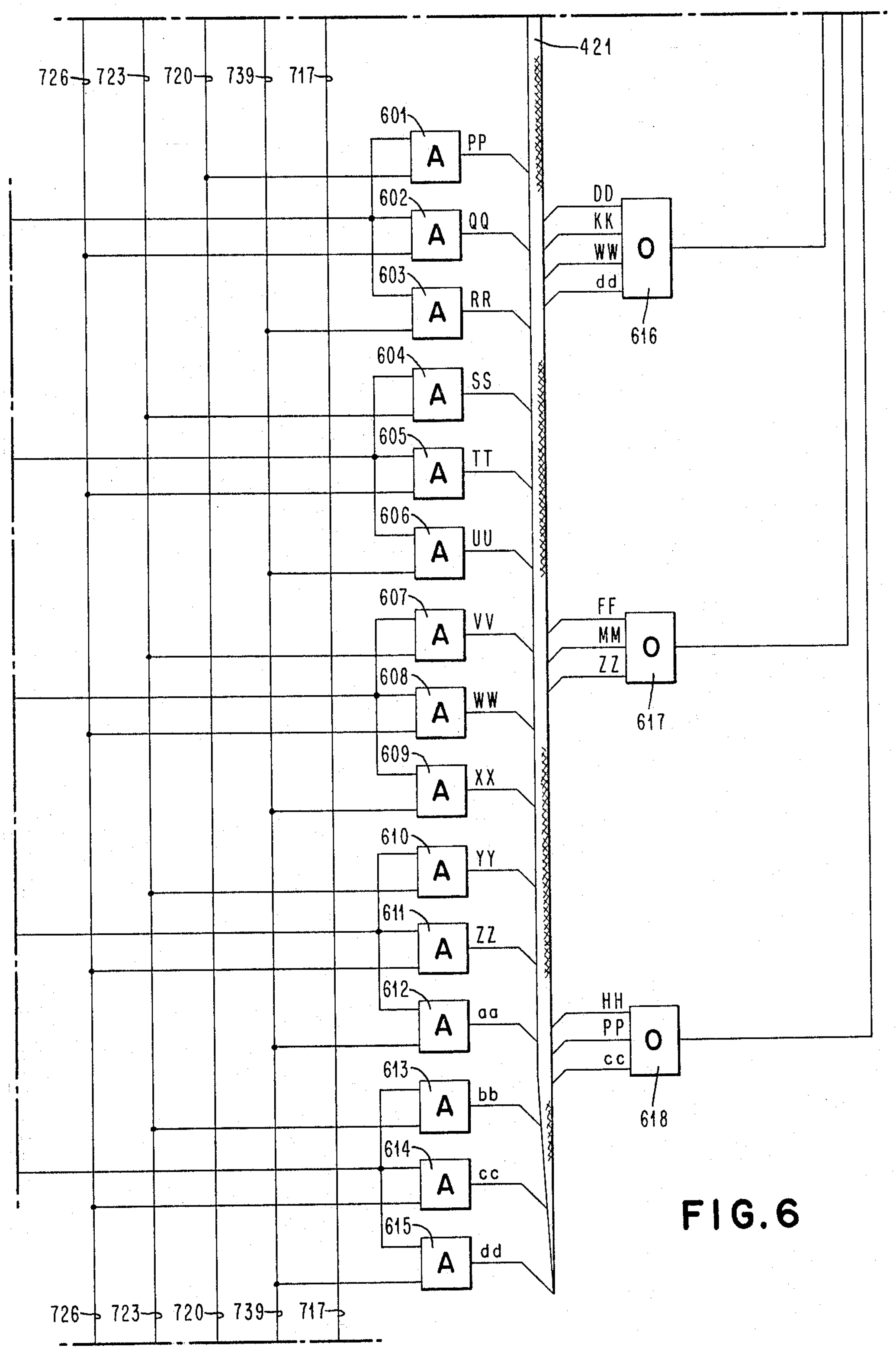

With the first byte in Input Data Register 122, appropriate binary ones and zeros will exist on Register 122 output lines 301–306, FIGURES 3 and 5. Register 122 also has output lines 307 and 308 that are used during 8 x 6 conversion operations. These lines are further extended to a number of tap lines A through *d*, FIGURES 3 and 5, that are then connected in a predetermined manner to AND (A) gates 309–323, FIGURE 3, and AND gates 505—505, FIGURE 5.

Whatever outputs exist on lines 301–306 at this time are therefore available on lines A, C, E, G, I and K to respectively condition one input each of AND gates 309, 311, 313, 315, 317 and 319, if a 1 bit is present in the corresponding positions of the Input Data Register 122.

A Sample 1 pulse on line 115 conditions input 709 of Gate 708. Gate 708 supplies an output on line 710 which conditions the other inputs of Gates 309, 311, 313, 315, 317 and 319. If these gates have both inputs up, they will provide outputs to respectively associated OR blocks 324–329. Therefore, the first six-bit byte is loaded into Conversion Register 125 storage positions T1–T6 as shown below:

| | |
|---|---|
| CR Position | T1—T2—T3—T4—T5—T6 |
| Byte Position | B—A—8—4—2—1 (First Input Byte) |

The Step 1 output of Generator 106 on line 705 is not applied elsewhere, so the remaining Sample pulses 2 and 3 are ineffective during Cycle 1. The net result of Cycle 1 is that the first six-bit byte is now in positions T1–T6 of the Conversion Register 125.

A Sample 4 pulse on line 118 steps Mode 1 Generator 106 so that it now supplies a Step 2 output for Cycle 2. The Step 2 output conditions AND gate 702 to give an output on line 711, which through an OR block 712, conditions one input of AND gate 713.

The output of AND gate 702 also conditions one input of an AND gate 714 through an OR block 715 and one input of an AND gate 718 by line 719. It should be noted at this time that the Trigger Reset Gate TRG 110 has logic therein that is essentially like the Output Sample Gate 109. The main difference is that gates in block 109 like Gate 714 are conditioned in common by Sample 2 pulses from Generator 114, while corresponding gates in TRG 110 are conditioned in common by Sample 3 pulses from Generator 114. The reasons for this arrangement will be apparent shortly. TRG 110 is not shown in its entirety because of the similarity mentioned.

Storage Unit 101 pulses Generator 114 on line 133, as before, to indicate that a character is in Input Data Register 122.

The second byte of information is now available in positions 1–6 of IDR 122 with corresponding binary one and binary zero outputs on lines 301–306.

A subsequent Sample 1 pulse from Generator 114 on line 115 conditions the other input of AND gate 713, which then supplies an input gating pulse on line 716.

This time the data bit tap lines O, R, U, X, A and D are of interest. With input gate line 716 up, the gates 323, 503, 506, 509, 512 and 515 will be conditioned to give an output if binary ones are present on their associated data lines O through *d*.

In this manner, the second six-bit byte is gated through OR blocks 330, 516, 517, 518, 519 and 520 to positions T7–T12 of the Conversion Register 125.

The Conversion Register 125 now has bytes stored as indicated below:

| CR Positions | T1 | T2 | T3 | T4 | T5 | T6 | T7 | T8 | T9 | T10 | T11 | T12 |
|---|---|---|---|---|---|---|---|---|---|---|---|---|
| | B | A | 8 | 4 | 2 | 1 | B | A | 8 | 4 | 2 | 1 |
| | (First Input Byte) | | | | | | (Second Input Byte) | | | | | |

A first eight-byte is read out from the Conversion Register 125 during the second 6 x 8 cycle.

This is accomplished by proper control of Output Gating 126 which generally comprises AND gates 401–415 and 601–615, as well as OR blocks 416–420 and 616–618. Outputs AA through *dd* are available under proper conditions from gates 401–415 and 601–615, and are applied over a Bus 421 to predetermined inputs of OR blocks 416–420 and 616–618.

Since AND gates 714 and 718 each had one input conditioned, a Sample 2 pulse on line 616 causes an Output Gating pulse from Gate 714 on line 717 and an Output Gating pulse from Gate 718 on line 720. These pulses are applied to one input each of AND gates 401, 403, 405, 407, 409, 411, 413 and 601.

Another input of each Gate 401–413 and 601 is conditioned by a line from Conversion Register 125 positions T1–T8 if a binary one had previously been stored in the related register position.

The first eight-bit byte is read to Output Data Register 128 as follows:

| | | | | | | | | |
|---|---|---|---|---|---|---|---|---|
| Inputs, Output Data Register 128 | 1 | 2 | 3 | 4 | 5 | 6 | 7 | 8 |
| First Output Byte | B | A | 8 | 4 | 2 | 1 | B | A |
| | (First Input Byte) | | | | | | (Second Input Byte) | |

The first eight-bit byte being read out results in a CR 125 condition as indicated below:

| CR Position | T1 | T2 | T3 | T4 | T5 | T6 | T7 | T8 | T9 | T10 | T11 | T12 |
|---|---|---|---|---|---|---|---|---|---|---|---|---|
| First Output Byte | B | A | 8 | 4 | 2 | 1 | B | A | | | | |
| Bits Remaining | | | | | | | | | 8 | 4 | 2 | 1 |

It will be noted that bits 8, 4, 2 and 1 of the second input byte remain in CR 125.

The reason for the similarity of TRG 110 to OSG 109 will now be evident. A Sample 3 pulse on line 117 conditions gates in TRG 110 like those in OSG 109 so that the trigger positions T1–T8 that were just read out, will be reset.

Whenever particular trigger positions in CR 125 are read out by a Sample 2 pulse, the same positions are rest by the Sample 3 pulse that immediately follows. The need for identical circuitry in OSG 109 and TRG 110 is thus apparent.

A Sample 4 pulse on line 118 steps Mode 1 Generator 106, as before, so that it now supplies a Step 3 output.

The Step 3 output through AND gate 703 and OR block 706 conditions one input of Input Gate 708. The Gate 703 output also directly conditions one input of output AND gate 721 by line 722, and the corresponding gate in TRG 110.

When the third six-bit byte is available in Input Data Register 122, the fact is indicated to Sample Generator 114 by a pulse on line 133, as before.

Sample 1 from Generator 114 conditions Gate 708 which causes the transfer of the third byte into Conversion Register positions T1–T6 by a pulse on line 710 in a manner identical with the gating of the first six-bit byte, previously discussed.

The Conversion Register 125 now stores bits as follows.

| CR Positions | T1 | T2 | T3 | T4 | T5 | T6 | T7 | T8 | T9 | T10 | T11 | T12 |
|---|---|---|---|---|---|---|---|---|---|---|---|---|
| | B | A | 8 | 4 | 2 | 1 | | | 8 | 4 | 2 | 1 |
| | (Third Input Byte) | | | | | | | | (Second Input Byte) | | | |

A Sample 2 pulse on line 116 completes the conditioning of AND gate 721. Therefore an output gating pulse is present on line 723. This conditions one input each of Output AND gates 402, 404, 406, 408, 604, 607, 610 and 613. The other inputs of these gates are respectively conditioned by associated Conversion Register positions T1–T4 and T9–T12 if one bits are stored therein.

Positions T1–T4 and T9–T12 are read out to the Output Data Register 128 as follows:

| | |
|---|---|
| Inputs, Output Data Register 128 | 1—2—3—4—5 —6 —7—8 |
| Second Output Byte | 8—4—2—1—B—A—8—4 (Second Input Byte) (Third Input Byte) |

This results in a Conversion Register 125 condition as indicated below:

| CR Positions | T1 | T2 | T3 | T4 | T5 | T6 | T7 | T8 | T9 | T10 | T11 | T12 |
|---|---|---|---|---|---|---|---|---|---|---|---|---|
| Second Output Byte Readout | B | A | 8 | 4 | | | | | 8 | 4 | 2 | 1 |
| | (Third Input Byte) | | | | | | | | (Second Input Byte) | | | |
| Bits Remaining | | | | | 2 | 1 | | | | | | |
| | | | | | (Third Input Byte) | | | | | | | |

It will be observed that the gating to the Output Data Register 128 is set up to insure that portions of input bytes follow one another in a logical manner. For example, the bits B–A of the second input byte that were in positions 7 and 8 of the first output byte will be followed by bits 8–4–2–1 of the second input byte in adjacent positions 1–2–3–4 of the second output byte.

Resetting of T1–T4 and T9–T12 is performed through TRG 110 by a Sample 3 pulse.

Sample 4 on line 118 steps the Mode 1 Generator 106 to Step 4. This results in an output from AND gate 704 to OR block 712 and conditions one input of Input AND gate 713. AND gate 704 output also conditions one input of Output AND gate 724 by line 725.

The presence of the fourth input byte in Input Data Register 122 is indicated by a pulse on line 133 to Generator 114. Sample 1 from Generator 114 conditions the other input of Gate 713, which supplies a gating pulse on line 716 to Input gates 323, 503, 506, 509, 512 and 515. The fourth input byte is thereby transferred to Conversion Register positions T7–T12.

The status of the register is now as follows:

| CR Position | T1 | T2 | T3 | T4 | T5 | T6 | T7 | T8 | T9 | T10 | T11 | T12 |
|---|---|---|---|---|---|---|---|---|---|---|---|---|
| Byte Positions | | | | | 2 | 1 | B | A | 8 | 4 | 2 | 1 |
| | | | | | (Third Input Byte) | | (Fourth Input Byte) | | | | | |

A Sample 2 pulse on line 116 conditions AND gate 724 which supplies a pulse on line 726. This results in the read out of Conversion Register positions T5–T12 to the respective input lines 1–8 of Output Data Register 128. A Sample 3 pulse resets T5–T12. Positions T1–T4 were previously reset during Cycle 3 so that the Conversion Register is now clear.

A Sample 4 pulse on line 118 steps the Mode 1 Generator 106 to Step 1 in preparation for another 6 x 8 transfer and conversion operation involving four input bytes of six bits each and three output bytes of eight bits each, if the 6 x 8 Mode 1 status continues.

*Mode 2 (8 x 6) transfer and conversion*

A Mode 2 or Write operation is established when Mode Trigger 103 is in a condition where its output ilne 111 is active as determined by an appropriate control pulse from Data Processor 102 on Bus 104.

Line 111 being active conditions one input each of AND gates 726–729. It will be assumed that Mode 2 Step Generator 112 is at Step 1 and that Sample Pulse Generator 114 is inactive.

Under these conditions Step 1 Gate 726 supplies an output on line 730 through OR block 706 to gate 708. The same output is applied directly to AND gate 731 on line 732. In addition, this output conditions Gate 714 through OR block 715.

The 8 x 6 operation differs slightly from the 6 x 8 operation in that the shorter six-bit output bytes are gated out on each of the four conversion cycles, while in the 6 x 8 operation, the longer eight-bit output bytes are gated out only during cycles 2, 3 and 4.

Readiness of Storage Unit 101 and gating of the first eight-bit byte in the Input Data Register 122 is indicated by a pulse on line 134 to Generator 114.

The Generator 114 supplies Sample 1, 2 and 3 pulses as usual. A Sample 1 pulse, through Gate 731 with an output on line 732 and Gate 708 with an output on line 710 transfers the first eight-bit input byte to positions T1–T8 of CR 125.

A Sample 2 pulse through Gate 714 causes the read out of position T1–T6 to the input lines 1–6 of Output Data Register 128. Positions T1–T6 are reset through TRG110.

Sample 4 by line 120 steps Mode 2 Generator 112 to Step 2. The output of Step 2 Gate 727 one line 733 conditions one input of Gate 734 and the same output on line 735 conditions one input of Gate 736 through OR block 737.

The next pulse on line 134 initiates Cycle 2, and indicates arrival of the second eight-bit input byte in the Input Data Register 122.

Sample 1 from Generator 114 completes conditioning of Gate 734 which then provides an output on line 738. This in turn conditions Input Gates 310, 312, 314, 316, 504, 507, 510 and 513 to load the second input byte in positions T1–T4 and T9–T12. It will be recalled that two bits of the first input byte remained in CR 125 positions T7 and T8 after the first 8 x 6 cycle.

With the input gating arrangements shown, positions 5–8 of the Input Data Register 122 are gated to CR 125 positions T1–T4. Positions 1–4 of the Input Data Register 122 are gated to CR 125 positions T9–T12. The purpose of this is to maintain an orderly transfer with related portions of information following one another in proper sequence as previously described in connection with the 6 x 8 operation.

The status of CR 125 at this time is as follows:

| CR Positions | T1 | T2 | T3 | T4 | T5 | T6 | T7 | T8 | T9 | T10 | T11 | T12 |
|---|---|---|---|---|---|---|---|---|---|---|---|---|
| Remainder, First Input Byte | | | | | | | B | A | | | | |
| | | | | | | | (Two bits remaining First Input Byte) | | | | | |
| Second Input Byte | B | A | 8 | 4 | | | | | 8 | 4 | 2 | 1 |

A Sample 2 pulse on line 116 results in an output from Gate 736 on line 739. This gates out positions T7–T12 of CR 125 to input lines 1–6 of Output Data Register 128. These positions are then reset by a succeeding Sample 3 pulse through TRG110.

Sample 4 on line 120 steps Mode 2 Generator 112 to Step 3. Cycle 2 has been completed, with two input bytes of eight-bit length having been converted to two output bytes of six-bit length, and with four bits remaining in CR 125 positions T1–T4.

An output from the Step 3 Gate 728 at this time conditions one input of Gate 740 by line 741 and one input of Gate 714 through OR block 715.

Cycle 3 is initiated by a pulse on line 134 which also indicates that the third input byte is in the Input Data Register 122. A Sample 1 pulse on line 115 conditions Gate 740 which supplies an output on line 742. This transfers the third input byte into CR 125, positions T4–T12.

The status of CR125 at this time is as follows:

| CR Positions | T1 | T2 | T3 | T4 | T5 | T6 | T7 | T8 | T9 | T10 | T11 | T12 |
|---|---|---|---|---|---|---|---|---|---|---|---|---|
| Bits Remaining from Second Input Byte | B | A | 8 | 4 | | | | | | | | |
| Bits in Third Input Byte | | | | | 2 | 1 | B | A | 8 | 4 | 2 | 1 |

A Sample 2 pulse through gate 714 causes positions T1–T6 to be read out. A Sample 3 pulse resets these positions through TRG110.

A Sample 4 pulse steps Mode 2 Generator 112 to Step 4 in readiness for Cycle 4. An output from Sample 4 Gate 729 conditions one input of Gate 736 through 737. It will be noted that no Input gates are conditioned on Step 4 of the 8 x 6 conversion operation.

A pulse on line 134 starts Cycle 4. Sample Pulse 1 is ineffective in this cycle. Sample Pulse 2 through Gate 736 effects the read out of CR 125 positions T7–T12 and they are reset by the Sample 3 pulse through TRG110. Sample 4 pulse steps Generator 112 to Step 1 in readiness for another 8 x 6 operation.

All positions of CR 125 have been cleared and the 8 x 6 operation is now completed. During this mode, three eight-bit input bytes have been converted to four six-bit output bytes.

It is apparent that the novel circuit arrangements disclosed constitute an efficient and effective data transfer and conversion circuit which performs with a minimum number of conversion storage positions.

While the invention has been particularly shown and described with reference to a preferred embodiment thereof, it will be understood by those skilled in the art that various changes in form and detail may be made without departing from the spirit and scope of the invention.

What is claimed is:

1. A data transfer and conversion circuit for converting a first group of bytes, each having a particular number of binary bits to a second group of bytes, said groups having the same number of bits, but their respective bytes having different numbers of binary bits with a non-integer multiple relationship, comprising:

a conversion register having a plurality of bit storage positions, said register having a maximum bit storage capacity which is less in number than the number of bits in each of said first or second group, said positions being inactive when available for storage of binary bits, or active when unavailable for storage of binary bits;

means for gating each byte of said first group in succession to selected inactive register positions thereby rendering them active;

and means for selectively gating output bytes in succession from active register positions.

2. A data transfer and conversion circuit for converting a first group of bytes each having a particular number of bits to a second group of bytes each having a different number of binary bits, said different members having a non-integer multiple relationship, and each of said groups involving a like total number of bits, comprising:

a conversion register having a plurality of storage positions, said register having a maximum bit storage capacity which is less than said total number but greater than the number of bits in each of said first or said second byte, means for gating each said first byte in succession during a conversion operation to load predetermined bit storage positions, and means for gating said second byte from selected bit storage positions when enough of said positions adequate in number to form a second byte have been loaded, thereby making said positions available for storage more than once during a conversion operation.

3. A data transfer circuit operable in a first mode for converting a group of first data bytes each having a particular number of bits to a group of second data bytes, each having a different number of bits or in a second mode for converting said second data bytes to said first data bytes comprising:

a conversion register having a number of storage positions, said register having a maximum bit storage capacity that is less in number than said first or second group but greater in number than each of said first or second byte;

first common circuit means for selectively gating according to mode an input byte to load available positions in said register;

second common circuit means for selevtively gating according to mode an output byte from previously loaded positions in said register;

and control means for establishing a first or second mode by appropriate gating of said first and second common circuit means.

4. A data transfer circuit for converting during a pre-established cyclic sequence a first group of data bits arranged in input bytes of particular length to a second group of data bits arranged in output bytes of greater length, comprising:

a conversion register having a number of bit storage positions, said register having a maximum bit storage capacity that is less in number than said first or second group, but greater in number than each of said first or second byte;

gating means operable during each of a first, second, third, and fourth cycles for loading an input byte into predetermined available storage positions of said register;

and gating means operable immediately following each loading operation in said second, third, and fourth cycles for gating an output byte from previously loaded register positions.

5. A data transfer circuit for converting during a pre-established cyclic sequence a first group of data bits arranged in input bytes of particular length to a second group of data bits arranged in output bytes of shorter length, comprising:

a conversion register having a number of bit storage positions, said register having a maximum bit storage capacity that is less in number than said first or second group, but greater in number than each of said first or second byte;

gating means operable during each of a first, second and third cycles for loading an input byte into predetermined available storage positions of said register;

and gating means operable immediately following each loading operation in said first, second and third cycles and a fourth cycle for gating an output byte from previously loaded register positions.

6. A data transfer circuit for converting a six-bit byte to an eight-bit byte comprising:

a conversion register having twelve storage positions, each of which is capable of storing a maximum of one bit, and each of which is either in an available or unavailable status for storing bit representations;

first means for conditioning a transfer of each of a group of six-bit bytes to available storage positions in said register during successive cycles;

second means for conditioning a transfer of each of a group of eight-bit bytes from previously loaded storage positions in said register during successive cycles thereby again making said positions available for storage;

and means for gating said first and second means to effect transfers in and out of said register in a timed sequence and with multiple use of the respective storage positions during a conversion operation.

7. A data transfer circuit for converting an eight-bit byte to a six-bit byte comprising:

a conversion register having twelve storage positions, each of which is capable of storing a maximum of one bit, and each of which is either in an available or unavailable status for storing bit representations;

first means for conditioning a transfer of each of a group of eight-bit bytes to available storage positions in said register during successive cycles;

second means for conditioning a transfer of each of a group of six-bit bytes from previously loaded storage positions in said register during successive cycles thereby again making said positions available for storage;

and means for gating said first and second means to effect transfers in and out of said register in a timed sequence and with multiple use of the respective storage positions during a conversion operation.

8. A data transfer circuit for converting a first group of input data bytes each having a particular bit length to a second group of output data bytes each having a different bit length, comprising:

storage means, said means including a number of bit storage positions with associated inputs and outputs, said positions having a maximum bit storage capacity less in number than the bits in a said first or second group of bytes, but greater in number than the bits in each of said input or output byte, and said positions being either available when not storing data bits, or unavailable when storing data bits;

means for selectively conditioning the inputs of said storage positions to establish in succession a first group of storage sets, each set including available storage positions only, and each set corresponding in length to an input byte;

means for loading each said input byte in succession into a particular one of said first storage sets; the successive input bytes in a group being stored in different storage positions in said storage means;

means for selectively conditioning the outputs of previously loaded storage positions to establish in succession a second group of storage sets, each set correponding in length to an output byte, and each set following in timed sequence a particular set of said first group;

and means for gating each said output set from said storage means.

9. A data transfer circuit for converting a first group of input data bytes of particular length to a second group of output data bytes of different length, comprising:

storage means having a minimum number of storage positions X based on the formula $X=A+B-LCF$ where each storage position has a maximum bit storage capacity of one bit, A is the number of bits in each byte of said first group, B is the number of bits in each byte of said second group, and LCF is the least common factor of A and B; A and B not having an integer multiple relationship;

means for selectively loading said input data bytes to available storage positions;

and means for selectively gating said output data bytes from loaded storage positions.

References Cited by the Examiner

UNITED STATES PATENTS

| | | | |
|---|---|---|---|
| 3,008,127 | 11/1961 | Block et al. | 340—172.5 |
| 3,079,597 | 2/1963 | Wild | 340—347 |

MAYNARD R. WILBUR, *Primary Examiner.*

DARYL W. COOK, MALCOLM A. MORRISON, *Examiners.*

W. J. KOPACZ, L. W. MASSEY, *Assistant Examiners.*